US011200568B2

(12) United States Patent
Baratam

(10) Patent No.: US 11,200,568 B2
(45) Date of Patent: Dec. 14, 2021

(54) COMPUTER-IMPLEMENTED METHOD, A COMPUTER SYSTEM AND A CRYPTOCURRENCY DEPOSITORY FOR ENABLING SECURE ESCROW AND SAFEKEEPING OF A CRYPTOCURRENCY

(71) Applicant: Praveen Baratam, Visakhapatnam (IN)

(72) Inventor: Praveen Baratam, Visakhapatnam (IN)

(*) Notice: Subject to any disclaimer, the term of this patent is extended or adjusted under 35 U.S.C. 154(b) by 245 days.

(21) Appl. No.: 16/357,553

(22) Filed: Mar. 19, 2019

(65) Prior Publication Data
US 2019/0213586 A1 Jul. 11, 2019

(30) Foreign Application Priority Data

Jul. 29, 2018 (IN) .............................. 201841028453
Jul. 29, 2018 (IN) .............................. 201841028454
Mar. 11, 2019 (IN) .............................. 201944009293

(51) Int. Cl.
*G06Q 20/38* (2012.01)
*G06Q 20/06* (2012.01)
*G06Q 20/10* (2012.01)

(52) U.S. Cl.
CPC ....... *G06Q 20/3825* (2013.01); *G06Q 20/065* (2013.01); *G06Q 20/0655* (2013.01); *G06Q 20/10* (2013.01); *G06Q 20/3829* (2013.01)

(58) Field of Classification Search
None
See application file for complete search history.

(56) References Cited

U.S. PATENT DOCUMENTS 10,790,976 B1 * 9/2020 Raevsky ............... H04L 9/0891
2017/0287090 A1 * 10/2017 Hunn ................... H04L 9/0643
(Continued)

FOREIGN PATENT DOCUMENTS

WO WO-2019155333 A1 * 8/2019 ........... G06Q 20/065

OTHER PUBLICATIONS

CESC2017 Steven Goldfeder, Escrow Protocols, Oct. 17, 2017, https://www.youtube.com/watch?v=_eWFmVcCUE (Year: 2017).*
(Continued)

*Primary Examiner* — John W Hayes
*Assistant Examiner* — Dennis G Keritsis
(74) *Attorney, Agent, or Firm* — Hill Wallack LLP; Jason L DeFrancesco

(57) ABSTRACT

There is provided a computer-implemented method, a computer system and a cryptocurrency depository for enabling secure escrow and safekeeping of a cryptocurrency. The computer implemented method starts by establishing a secure communication between a first party device associated with a depositor of the cryptocurrency and a second party device associated with a secure cryptocurrency depository, in a cryptocurrency network. The secure cryptocurrency depository is a secure cryptocurrency escrow and/or a secure cryptocurrency vault. Further, the first party device and/or the second party device is enabled to transfer the available funds/tokens away from the multi-signature address using the second partially signed provisional transaction template and/or the first partially signed provisional transaction template in possession of the first party device and second party device respectively, in case the first party and/or second party private-keys/secrets and/or the hardware tokens are lost/stolen, thereby preventing theft.

16 Claims, 17 Drawing Sheets

(56) References Cited

U.S. PATENT DOCUMENTS

2018/0005186 A1* 1/2018 Hunn .................... G06F 40/103
2018/0174255 A1* 6/2018 Hunn .................... H04L 9/3247

OTHER PUBLICATIONS

CESC2017 Steven Goldfeder, Escrow Protocols (transcript part), Oct. 17, 2017, https://www.youtube.com/watch?v=_eWFmVcCUE (Year: 2017).*
Richard Olsen, Case study of Lykke exchange: architecture and outlook, Sep. 24, 2017 (Year: 2017).*
Steven Andrew Goldfeder, Off-chain protocols for cryptocurrencies, Sep. 2018 (Year: 2018).*
Dylan Yaga, NISIR 8202 Blockchain Technology Overview, https://doi.org/10.6028/NIST.IR.8202 (Year: 2018).*

* cited by examiner

COMPUTER-IMPLEMENTED METHOD, A COMPUTER SYSTEM AND A CRYPTOCURRENCY DEPOSITORY FOR ENABLING SECURE ESCROW AND SAFEKEEPING OF A CRYPTOCURRENCY

TECHNICAL FIELD

Embodiments of the present invention generally relate to a digital currency management system and more particularly to a computer-implemented method, a computer system and a cryptocurrency depository for enabling secure escrow and safekeeping of a cryptocurrency.

BACKGROUND

A digital currency/cryptocurrency is a digital asset designed for currency exchange/transactions. The cryptocurrency utilizes strong cryptography to execute secure financial transactions.

A cryptocurrency is acquired and/or traded on an electronic exchange which lists different types of cryptocurrencies/crypto-assets. Such exchanges often enable trading between digital currencies and conventional fiat currencies such as US Dollar, Euro, Great Britain Pound, etc. The cryptocurrency exchange is custodial in nature and acts as an Escrow (Trusted Third Party) to minimize counter-party risk wherein the trading parties transfer both cryptocurrencies and other assets which are in their control/possession to the exchange-controlled addresses/accounts and get notional limits on the exchange to trade. All this works well as long as there are no security lapses on the exchange.

Most cryptocurrencies are secured by strong encryption. Unauthorized access of the respective private-keys/secrets results in breach of security on a cryptocurrency management system. A person (other than real owner) who gains access to exchange's private-keys/secrets may steal the stored cryptocurrencies, thereby resulting in huge economic loss to the trading parties and loss of trust within the ecosystem. A study shows, cryptocurrencies worth 15 Billion USD were stolen as of 2017. Thus, the security of the cryptocurrency exchanges has become the Achilles heel of the cryptocurrency ecosystem.

Over the period of time, cryptocurrency exchanges have adopted several strategies such as hot-wallets coupled with cold/offline storage, multi-signature arrangements with third-parties that serve as gatekeepers and enforce limits on transactions, insurance for hot funds, etc., to control or provide solution to the unauthorized access of respective private-keys/secrets. However, the existing strategies proved inadequate and/or were circumvented over the past few years by increasingly sophisticated hacking attacks.

Similar to the cryptocurrency exchange, a custodial cryptocurrency wallet service or cryptocurrency wallet also stores the funds/tokens for its users and settles transactions between transacting parties. The cryptocurrency wallet allows its users to perform transactions in a same manner as performed in a conventional bank. And most of the security problems discussed above in the context of cryptocurrency exchanges are equally relevant to cryptocurrency wallets. In fact, many cryptocurrency exchanges also double up as cryptocurrency wallets for their users allowing transacting parties to pay/accept in cryptocurrency/assets of their choice and manage the conversion for them when necessary.

Therefore, in light of the foregoing discussion, there exists a need to overcome the aforementioned drawbacks associated with cryptocurrency exchanges, wallets, etc. by providing a computer-implemented method, a computer system and a cryptocurrency depository for enabling secure escrow and safekeeping of a cryptocurrency to prevent loss of funds/tokens of trading/transacting parties and bolster general faith in the cryptocurrency ecosystem.

SUMMARY OF THE INVENTION

According to a first aspect of the present invention, there is provided a computer-implemented method for enabling secure escrow and safekeeping of a cryptocurrency. The computer-implemented method comprises the steps of establishing a secure communication between a first party device associated with a depositor of the cryptocurrency and a second party device associated with a secure cryptocurrency depository, in a cryptocurrency network, creating and signing a deposit transaction by the first party device transferring all available funds/tokens or part thereof to a multi-signature address, creating a provisional transaction template by the first party device spending either all of the funds/tokens or a part thereof sent to the multi-signature address in the deposit transaction, transmitting an unsigned copy of the provisional transaction template to the second party device, adding a signature generated using first party private key and a signature generated by a first party hardware token by the first party device to the provisional transaction template thereby generating a first partially signed provisional transaction template and transmitting the first partially signed provisional transaction template to the second party device, adding a signature generated using second party private key corresponding to the first party private key, by the second party device to the provisional transaction template thereby generating a second partially signed provisional transaction template and sending the second partially signed provisional transaction template to the first party device, broadcasting the deposit transaction by the first party device after the first party device and the second party device exchange the first partially signed provisional transaction template and the second partially signed provisional transaction template, facilitating the provisional transaction by the first party device by adding the signature generated using first party private key and the signature generated by the first party hardware token to the second partially signed provisional transaction template in possession, forming a fully signed provisional transaction template, facilitating the provisional transaction by the second party device by adding the signature generated using second party private key to the first partially signed provisional transaction template in possession forming the fully signed provisional transaction template, thereby presenting an alternate way, broadcasting a fully signed provisional transaction template by the first party device and/or the second party device to the cryptocurrency network, when necessary. Consequently, the first party device and/or the second party device is enabled to transfer the available funds/tokens away from the multi-signature address using the second partially signed provisional transaction template and/or the first partially signed provisional transaction template in possession of the first party device and second party device respectively using the various options provided by the corresponding Provisional Transaction output, in case the first party and/or second party private-keys/secrets and/or the hardware tokens are lost/stolen, thereby preventing theft.

In accordance with an embodiment of the present invention, the secure cryptocurrency depository associated with the second party device is a secure cryptocurrency escrow and/or a secure cryptocurrency vault.

In accordance with an embodiment of the present invention, the computer-implemented method further comprises the step of creating the provisional transaction template by the second party device in case a transaction ID and a corresponding transaction output index of the deposit transaction is transmitted to the second party device by the first party device.

In accordance with an embodiment of the present invention, signing the deposit transaction and the provisional transaction template prevents the corresponding inputs and outputs of the deposit transaction and the provisional transaction template from modification once the signature generated using respective private-keys and/or the signature generated by respective hardware tokens are added to the deposit transaction and the provisional transaction template.

In accordance with an embodiment of the present invention, the first party device and the second party device are computing devices selected from a group comprising a server, a microcontroller, a laptop, a desktop and a portable handheld device having computing capabilities and comprising at least a processor, a memory unit, a display module, an input module and a user interface.

In accordance with an embodiment of the present invention the computer-implemented method further comprises the step of monitoring the transactions on the cryptocurrency network by the first party device, the second party device and/or a third-party device on behalf of the first and/or second party device.

In accordance with an embodiment of the present invention the computer-implemented method further comprises the step of enforcing a settlement albeit with a predefined delay and does not require exclusive custody of the funds/tokens beforehand to guarantee settlement.

In accordance with an embodiment of the present invention the computer-implemented method further comprises the step of taking exclusive custody of the respective funds/tokens to enforce the settlement, in case of disagreement between a first party device and a fourth party device during a trade/transaction, thereby functioning as a regular custodial escrow.

According to a second aspect of the invention, there is provided a computer system for enabling secure escrow and safekeeping of a cryptocurrency. The computer system comprises a memory unit configured to store machine-readable instructions and a processor operably connected with the memory unit, the processor obtaining the machine-readable instructions from the memory unit, and being configured by the machine-readable instructions to establish a secure communication between a first party device associated with a depositor of the cryptocurrency and a second party device associated with a secure cryptocurrency depository, in a cryptocurrency network, create and sign a deposit transaction by the first party device transferring all available funds/tokens or part thereof to a multi-signature address, create a provisional transaction template by the first party device spending either all of the funds/tokens or a part thereof sent to the multi-signature address in the deposit transaction, transmit an unsigned copy of the provisional transaction template to the second party device, generate a first partially signed provisional transaction template by adding a signature generated using a first party private key and a signature generated by a first party hardware token by the first party device to the provisional transaction template, transmit the first partially signed provisional transaction template to the second party device, generate a second partially signed provisional transaction template by adding a signature generated using a second party private key corresponding to the first party private key, by the second party device to the provisional transaction template, transmit the second partially signed provisional transaction template to the first party device, broadcast the deposit transaction by the first party device after the first party device and the second party device exchange the first partially signed provisional transaction template and the second partially signed provisional transaction template, facilitate the provisional transaction by the first party device by adding the signature generated using the first party private key and the signature generated by the first party hardware token to the second partially signed provisional transaction template in possession of the first party device forming a fully signed provisional transaction template, facilitate the provisional transaction by the second party device by adding the signature generated using the second party private key to the first partially signed provisional transaction template in possession of the second party device forming the fully signed provisional transaction template, thereby presenting an alternate way, broadcast a fully signed provisional transaction template by the first party device and/or the second party device to the cryptocurrency network, when necessary. Consequently, the first party device and/or the second party device is enabled to transfer the available funds/token away from the multi-signature address using the second partially signed provisional transaction template and/or the first partially signed provisional transaction template in possession of the first party device and second party device respectively using the various options provided by the corresponding Provisional Transaction output, in case the first-party/second-party private-keys/secrets and/or hardware tokens are lost/stolen, thereby preventing theft.

In accordance with an embodiment of the present invention, the secure cryptocurrency depository associated with the second party device is a secure cryptocurrency escrow and/or a secure cryptocurrency vault.

In accordance with an embodiment of the present invention, the processor is further configured to create the provisional transaction template by the second party device in case a transaction ID and a corresponding transaction output index of the deposit transaction is transmitted to the second party device by the first party device.

In accordance with an embodiment of the present invention, the processor is further configured to prevent the corresponding inputs and outputs of the deposit transaction and the provisional transaction template from modification once the signature generated using respective private keys and/or the signature generated by respective hardware tokens are added to the deposit transaction and the provisional transaction template.

In accordance with an embodiment of the present invention, the first party device and the second party device are computing devices selected from a group comprising a server, a microcontroller, a laptop, a desktop and a portable handheld device, having computing capabilities and comprising at least a processor, a memory unit, a display module, an input module and a user interface.

In accordance with an embodiment of the present invention, the processor is further configured to monitor the transactions on the cryptocurrency network by the first party device, the second party device and/or a third-party device on behalf of the first party device and/or second party device.

In accordance with an embodiment of the present invention, the processor further configures the second party device to enforce a settlement albeit with a predefined delay and does not require exclusive custody of the funds/tokens beforehand to guaranteed settlement.

In accordance with an embodiment of the present invention, the processor further configures the second party device to take exclusive custody of the respective funds/tokens to enforce the settlement, in case of disagreement between a first party device and a fourth party device during a trade/transaction, thereby functioning as a regular custodial escrow.

According to a third aspect of the present invention, there is provided a secure cryptocurrency depository having an associated second party device in communication with a first party device associated with a first party, in a cryptocurrency network. Further, the secure cryptocurrency depository is configured to store the cryptocurrency of the first party device associated with a depositor.

In accordance with an embodiment of the present invention, the second party device is configured to take exclusive custody of the respective funds/tokens to enforce the settlement, in case of disagreement between a first party device and a trading party device during a trade, thereby functioning as a regular custodial escrow.

According to a fourth aspect of the present invention, there is provided an unrecoverable hardware token in possession of each of a first party and/or a second party having stored therein, private-keys/secrets, generated during initialization. Further, the unrecoverable hardware token is required to be physically accessed to sign transactions using them. Furthermore, the unrecoverable hardware token associated with each of the first party and/or the second party is configured to generate a signature using internally stored private-keys/secrets to authenticate transactions and the unrecoverable hardware token is configured to provide out-of-band authentication by preventing any backup or recovery of the private-keys/secrets stored therein.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE DRAWINGS

Figure 1:
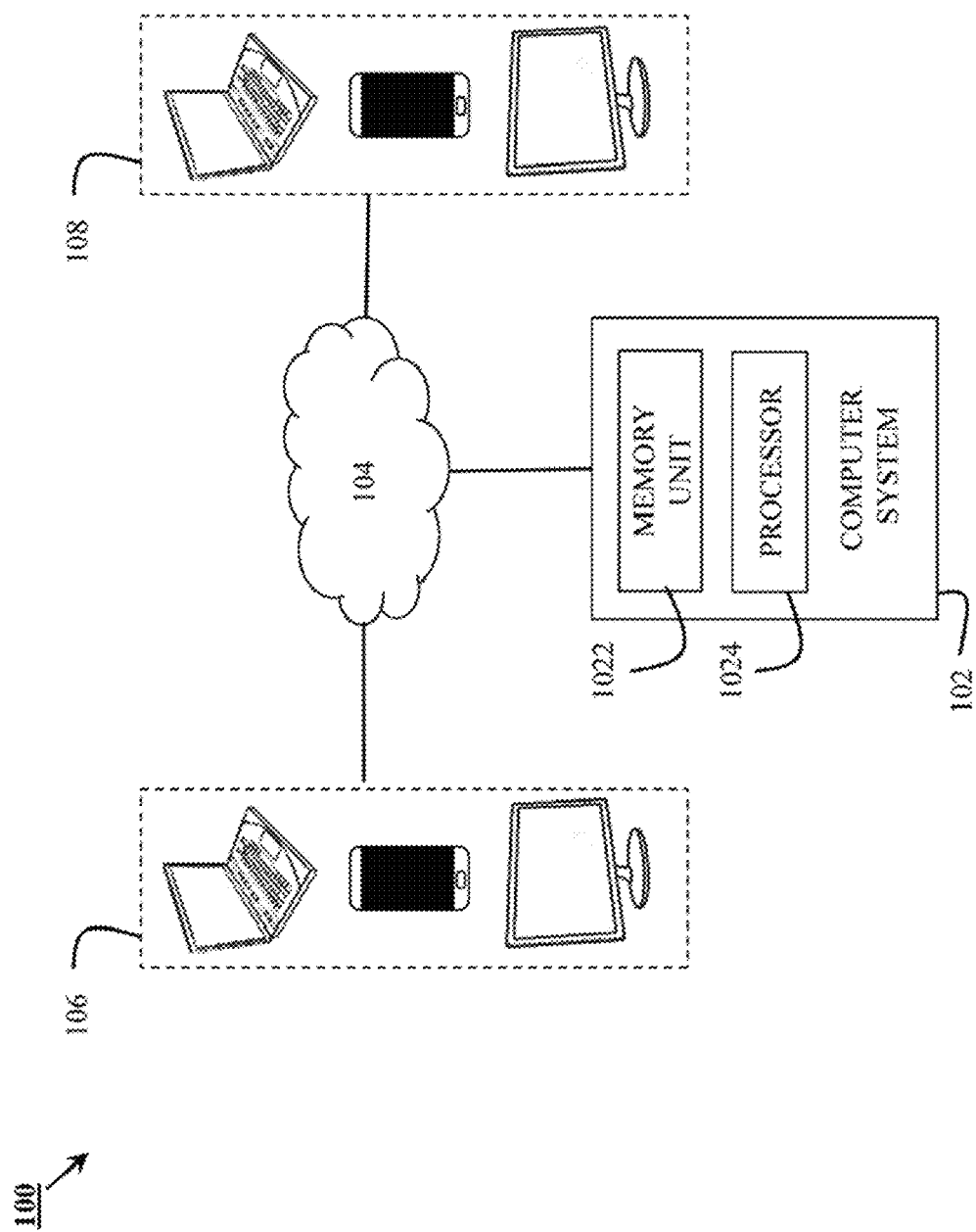
FIG. 1 is an exemplary environment of computing devices to which the various embodiments described herein may be implemented.

The present invention is described hereinafter by various embodiments with reference to the accompanying drawing, wherein reference numerals used in the accompanying drawing correspond to the like elements throughout the description.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Referring to the drawings, the invention will now be described in more detail. FIG. 1 illustrates an exemplary environment 100 of computing devices to which the various embodiments described herein may be implemented. FIG. 1 shows a first party device 106 connected with a second party device 108 participating in cryptocurrency network. The first party device 106 is associated with a first party or a depositor of a cryptocurrency. The depositor may be, but not limited to, an organization, an individual or the any owner of cryptocurrency. The cryptocurrency may be selected from, but not limited to, Bitcoin, Litecoin, Ethereum, Dash or any digital currency. Additionally, the second party device 108 is associated with a secure cryptocurrency depository. The secure cryptocurrency depository may be a secure cryptocurrency escrow and/or a secure cryptocurrency vault. Provision of the cryptocurrency escrow in the cryptocurrency network reduces the probability of loss or theft of the first party's funds/tokens during a trade/transaction from the depository associated with the second party device 108. The secure cryptocurrency vault of the secure cryptocurrency depository is configured to store the cryptocurrency of the first party device 106 associated with the depositor.

The first party device 106 and the second party device 108 are computing devices selected from a group comprising a server, a microcontroller, a laptop, a desktop and a portable handheld device having computing capabilities and comprising at least a processor, a memory unit, a display module, an input module and a user interface. The first party device 106 and the second party device 108 are connected with a network 104. The network 104 may be one of, but not limited to, a Local Area Network (LAN) or a Wide Area Network (WAN). The network 104 may be implemented using a number of protocols, such as but not limited to, TCP/IP, 3GPP, 3GPP2, LTE, IEEE 802.x etc.

Further connected to the network 104 is a computer system 102 configured to facilitate communication and transactions in the cryptocurrency network in the exemplary environment 100. The computer system 102 may be a portable computing device, a desktop computer or a server stack. The computer system 102 is envisaged to include computing capabilities such as a memory unit 1022 configured to store machine readable instructions. The machine-readable instructions may be loaded into the memory unit 1022 from a non-transitory machine-readable medium such as, but not limited to, CD-ROMs, DVD-ROMs and Flash Drives. Alternately, the machine-readable instructions may be loaded in a form of a computer software program into the memory unit 1022. The memory unit 1022 in that manner may be selected from a group comprising EPROM, EEPROM and Flash memory. Further, the computer system 102 includes a processor 1024 operably connected with the memory unit 1022. In various embodiments, the processor 1024 is one of, but not limited to, a general-purpose processor 1024, an application specific integrated circuit (ASIC) and a field-programmable gate array (FPGA).

Figure 2:
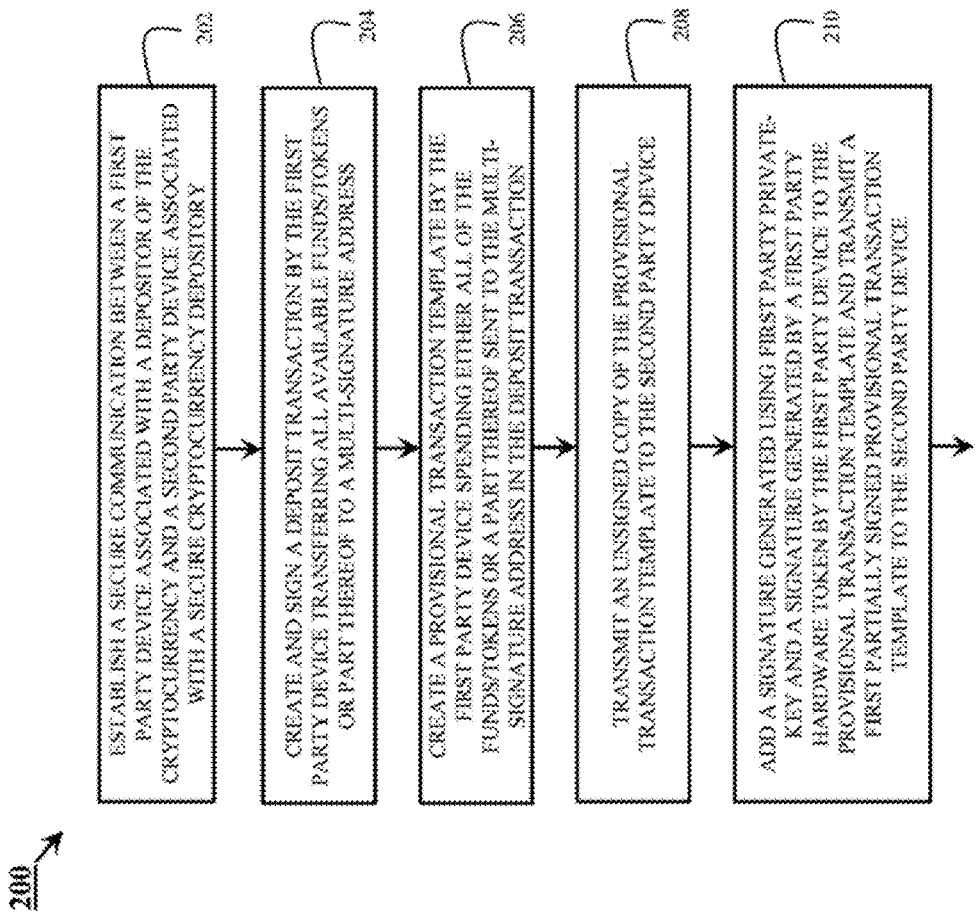
FIG. 2 illustrates computer-implemented method for enabling secure escrow and safekeeping of a cryptocurrency, in accordance with an embodiment of the present invention.
Figure 2:
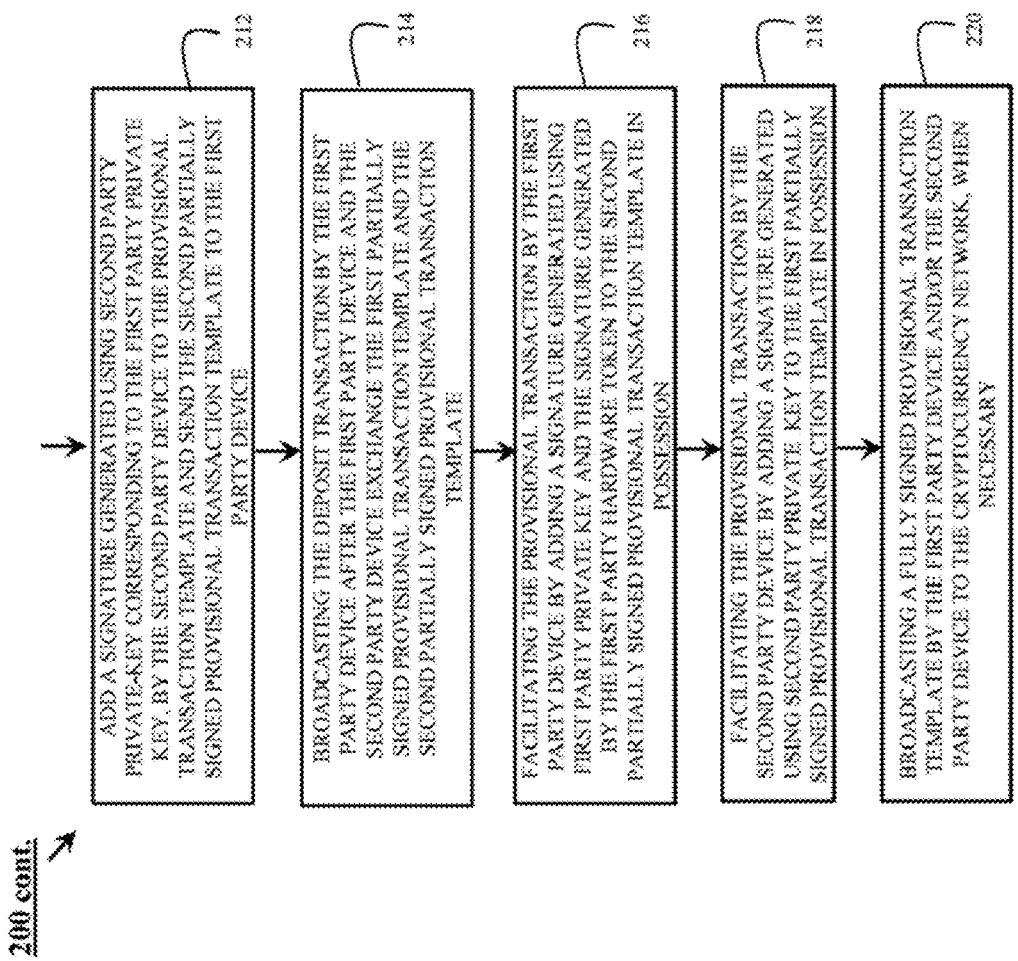
Figure 3:
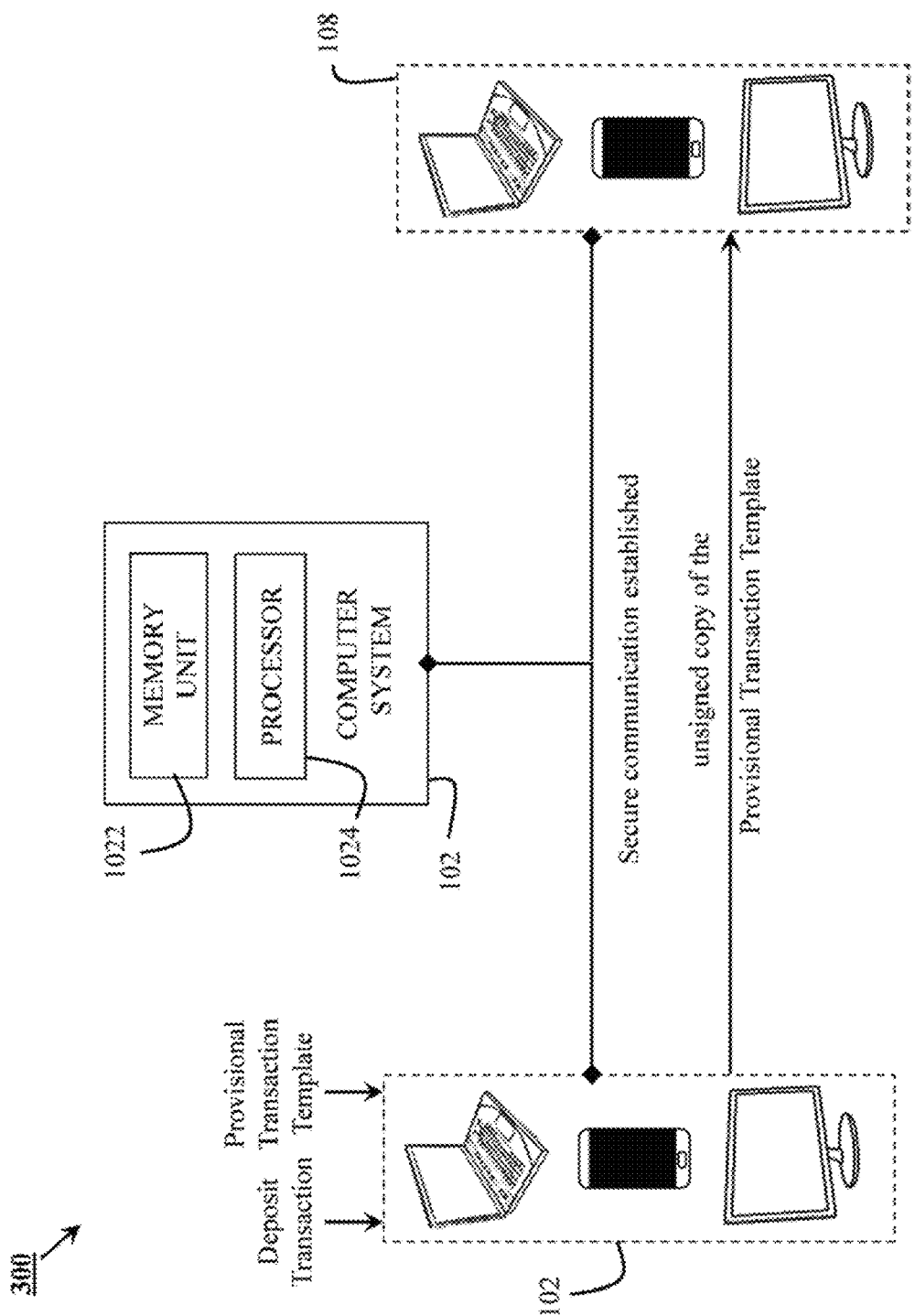
FIG. 3 illustrates an information flow diagram for establishing a communication between a first party device and a second party device as well as creating a deposit transaction and provisional transaction template, in accordance with an embodiment of the present invention.

FIG. 2 illustrates computer-implemented method for enabling secure exchange and safekeeping of a cryptocurrency, in accordance with an embodiment of the present invention. The method begins at step 202, by establishing the communication between the first party device 106 associated with the depositor of the cryptocurrency and the second party device 108 associated with the secure cryptocurrency depository. The same has been illustrated in FIG. 3. As shown in FIG. 3, the processor is configured to securely connect the first party device 106 and the second party device 108 in a cryptocurrency network. Further, at step 204, a deposit transaction is created and signed by the first party device 106 transferring all available funds/tokens or part thereof to a multi-signature address. In this step, the first party device 106 may add the required security protocols, etc. to the respective inputs of the deposit transaction and stores it without broadcasting it to the cryptocurrency network. A multi-signature address, in general, requires signatures or unique inputs associated with multiple parties to authenticate and allow a transfer of funds from the multi-signature address.

Then at step 206, a provisional transaction template is created by the first party device 106. The provisional transaction template herein signifies an electronic record/document indicative of the first party's intent to spend either all of the funds/tokens or a part thereof, sent to the multi-signature address in the deposit transaction. After that, at step 208, an unsigned copy of the provisional transaction template is transmitted to the second party device 108. Herein, the unsigned copy means that the provisional transaction template is without any signed inputs or signatures (i.e. without any authentication).

Figure 4:
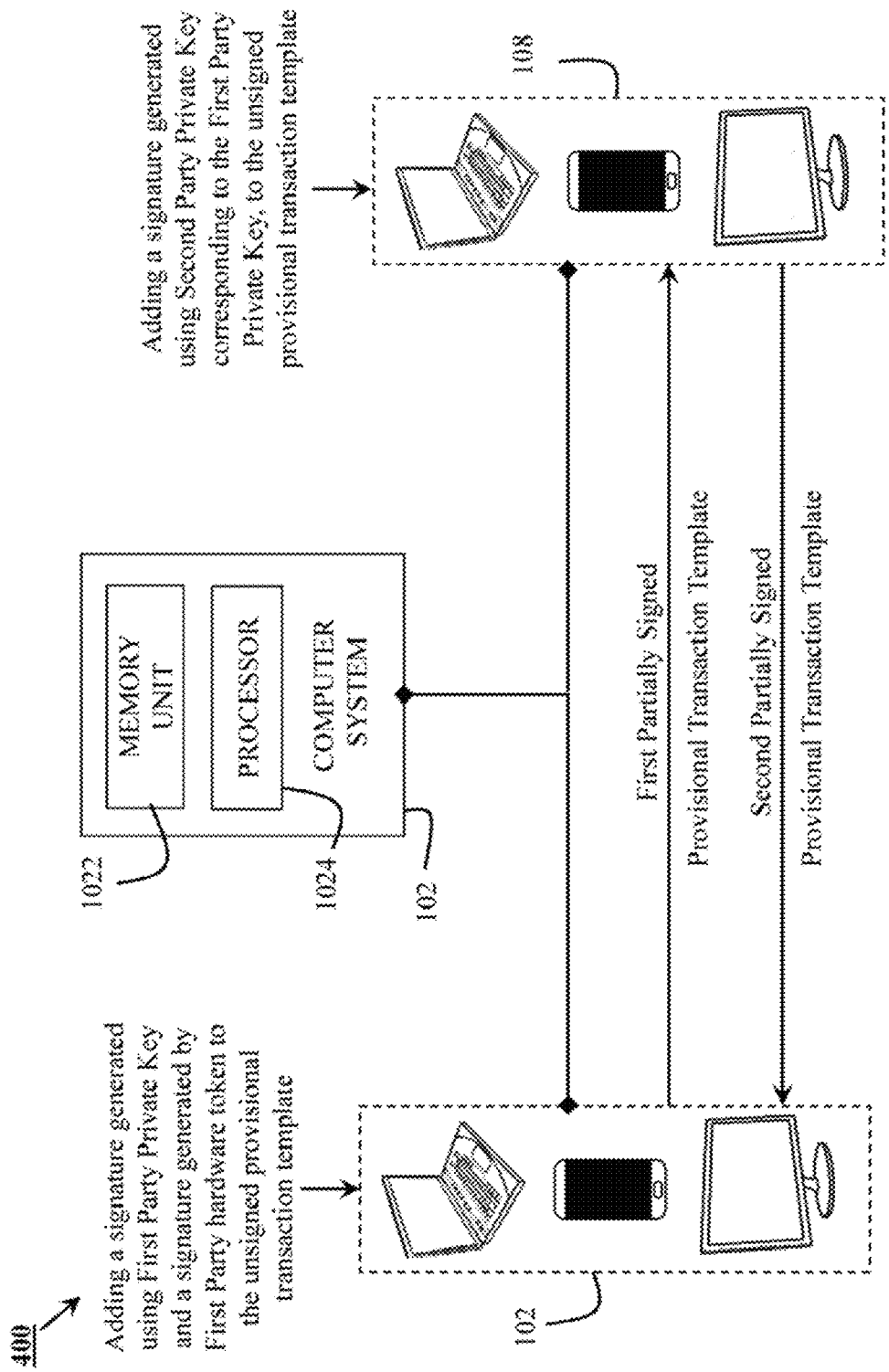
FIG. 4 illustrates an information flow diagram for signing and exchanging a first partially signed provisional transaction template and a second partially signed provisional transaction template by the first party device and the second party device, in accordance with an embodiment of the present invention.

Referring to FIG. 4, at step 210, the first party device 106 adds a signature generated using a first party private key and a signature generated by a first party hardware token to the provisional transaction template, thereby generating a first partially signed provisional transaction template. The present disclosure presumes that the hardware tokens are unrecoverable hardware wallets (or rendered unrecoverable by not-recording/discarding the backup/seed-phrase) without any provision for recovery of the private-keys/secrets stored inside it and time-locks for transaction outputs are available for the crypto-currency system. In an embodiment, the computer system 102 provides out-of-band authentication with hardware tokens, that are not knowledge-based and require physical access to complete the step. The hardware tokens are special kind of hardware wallets, that do not allow a backup or recovery of any sort providing true out-of-band authentication and device failure is already accounted for in the proposed method/system. Additionally, the hardware tokens are envisaged to be in possession of the first party and/or second party and are therefore referred to as first party and/or second party hardware token.

Then, the first partially signed provisional transaction template is transmitted to the second party device 108. The second party device 108 keeps this first partially signed provisional transaction template safe and stores for use in future. Also, at step 212, the second party device 108 adds a signature generated using a second party private key corresponding to the first party private key, to the unsigned copy of the provisional transaction template received in step 208. This generates a second partially signed provisional transaction template. The second partially signed provisional transaction template is then sent to the first party device 106. At this stage, the first party device 106 has the second partially signed provisional transaction template signed with the second party private key and the second party device 108 has the first partially signed provisional transaction template signed with the first party private key and the signature generated by the first party hardware token.

In an embodiment, the provisional transaction template can also be created by the second party device and shared with the first party device if a transaction ID and a corresponding transaction output index of the deposit transaction is transmitted to the second party device by the first party device. Then, the partially signed provisional transaction templates can be exchanged as above.

In another embodiment, the signatures utilized in this scheme sign the transaction similar to a SIGHASH_ALL or SIGHASH_SINGLE option in Bitcoin protocol where the corresponding inputs and outputs of the transaction cannot be modified once signatures are added to the transaction.

Then at step 214, the deposit transaction is broadcasted by the first party device 106. It is envisaged that the deposit transaction may only be broadcasted after the first party device 106 and the second party device 108 exchange the first partially signed provisional transaction template and the second partially signed provisional transaction template. This completes a setup process. Now the process of facilitation of transactions and recovery of funds in case of a security breach or compromise, by both the first party device 106 and the second party device 108 will be explained in detail.

Figure 5:
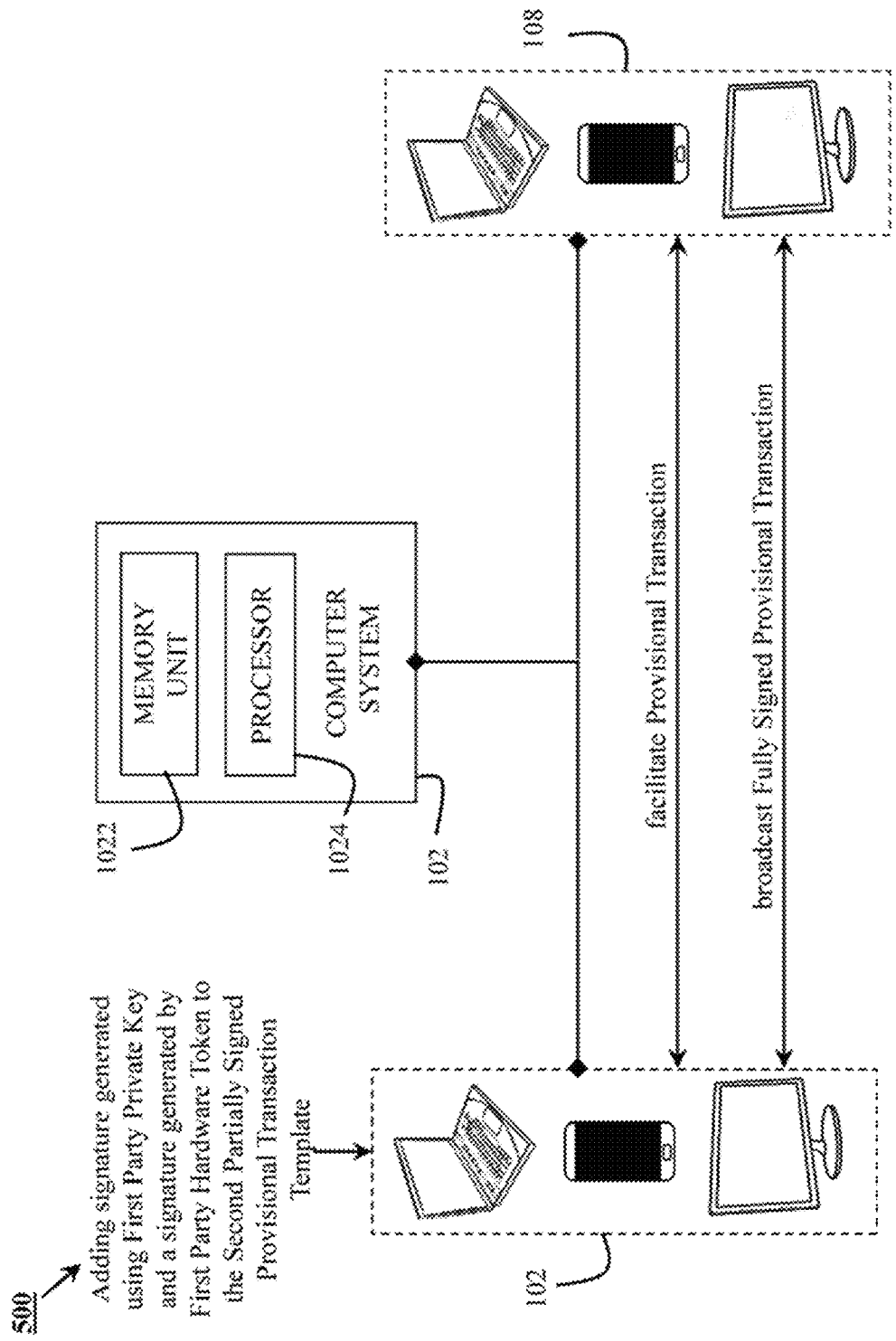
FIG. 5 illustrates an information flow diagram for facilitating and broadcasting the provisional transaction by the first party, in accordance with another embodiment of the present invention.

At step 216, the first party device 106 facilitates the provisional transaction by adding the signature generated using the first party private key and the signature generated by the first party hardware token to the second partially signed provisional transaction template in its possession. This forms a fully signed provisional transaction template signed using all of the signature generated using the first party private key of first party (depositor), the signature generated using the second party private key of second party (depository) and the signature generated by the first party hardware token. The first party device 106 may now use the fully signed provisional transaction to execute the transfer of funds/token mentioned in the provisional transaction from the multi-signature address when necessary. The same has been illustrated in FIG. 5.

Figure 6:
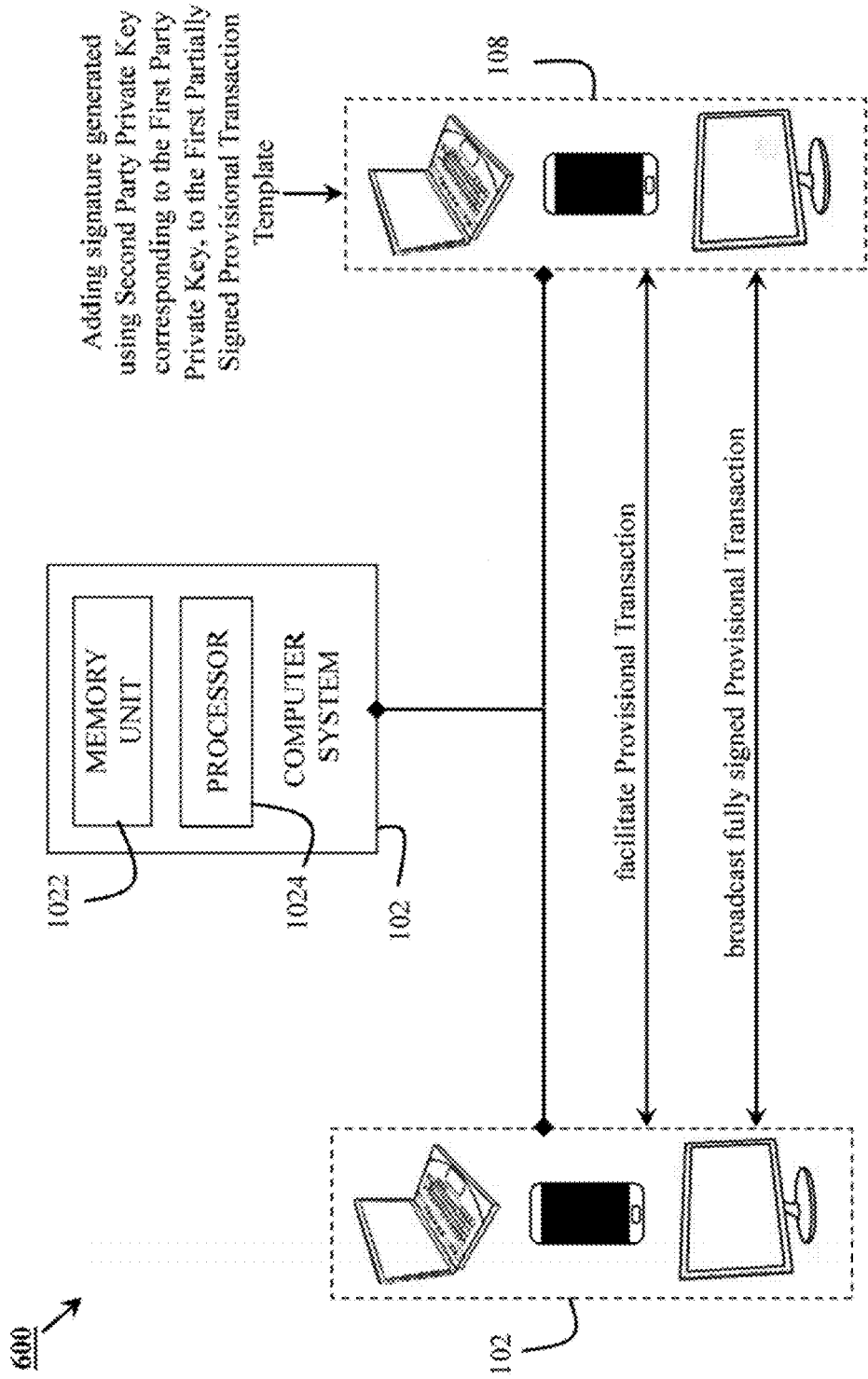
FIG. 6 illustrates an information flow diagram for facilitating and broadcasting the provisional transaction by the second party, in accordance with an embodiment of the present invention.

Step 218 presents an alternate way of facilitating the provisional transaction. At this step, the second party device 108 may facilitate the provisional transaction by adding the signature generated using the second party private key to the first partially signed provisional transaction template in possession, forming the fully signed provisional transaction template. This forms the fully signed provisional transaction template signed using all of the signature generated using the first party private key of first party (depositor), the signature generated using the second party private key of second party (depository) and the signature generated by the first party hardware token. The second party device 108 may now use the fully signed provisional transaction to execute the transfer of funds/token mentioned in the provisional transaction from the multi-signature address when necessary. The same has been illustrated in FIG. 6.

At step 220, the first party device 106 and/or the second party device 108 broadcast a fully signed provisional transaction template to the cryptocurrency network, when necessary to complete the provisional transaction and transfer of funds.

Further, the first party device 106 and/or the second party device 108 is enabled to transfer the available funds/token away from the multi-signature address, using the second partially signed provisional transaction template and the first partially signed provisional transaction template in possession of the first party device 106 and second party device 108 respectively, in case respective private-keys/secrets and/or the hardware tokens are lost/stolen, thereby preventing theft. In accordance with an embodiment, the security of first party systems is breached and first party private key and/or other data is lost/stolen. The breach may result in potential loss of its funds/tokens. However, the present invention provides safeguard against the loss of funds/tokens by recovering the funds by adding the signature generated using second party private key to the first partially signed provisional transaction template (already signed with the signature generated using first party private key and signature generated by first party hardware token) in possession of the second party (depository). The fully signed provisional transaction template may then be broadcasted to the respective cryptocurrency network. In exemplary condition the first party in coordination with second party may recover the funds/tokens by creating another transaction and moving the funds/tokens from provisional transaction to another secure address before 5000 blocks are created on the respective cryptocurrency network after the block confirming the broadcasted provisional transaction.

In accordance with another embodiment, the second party's private-key and/or other data is breached/stolen. The breach may result in potential loss of the funds/tokens. However, the present invention provides safeguard against the loss of funds by recovering the funds by adding the signature generated using the first party private-key and signature generated by the first party hardware token to the second partially signed provisional transaction template (already signed with the signature generated using the second party private key) in possession of the first party. The fully signed provisional transaction may then be broadcasted to the respective cryptocurrency network. In exemplary condition the second party in coordination with first party may recover the funds/tokens by creating another transaction and moving the funds/tokens from provisional transaction to another secure address before 2000 blocks are created on the respective cryptocurrency network after the block confirming the broadcasted provisional transaction.

This way, the present invention accounts for many contingencies such as loss and/or breach of either party's private-keys/secrets and malfunction, loss and/or possible theft of either party's Hardware Tokens while reducing the probability of loss of First Party's funds/tokens. The funds/tokens are recovered, thereby removing the incentive and consequently motive to steal First Party's funds/tokens in the first place.

In accordance with an embodiment of the present invention, after the deposit transaction is confirmed on the cryptocurrency network, the first Party and second party start monitoring the cryptocurrency network in order to keep track of transactions referencing the deposit transaction and the multi-signature address described above from the deposit transaction to detect any breach of security or foul play. The monitoring may be done by the First Party and/or the Second Party directly or by a Third Party on behalf of First Party and/or Second Party.

In accordance with an embodiment, as soon as the provisional transaction is broadcasted, the first party and the second party are prompted to initiate recovery if it is not broadcasted by either of them to begin with. Any of the parties in coordination with the other or optionally unilaterally create and broadcast a transaction using the respective options of the provisional transaction transferring the funds/tokens to a desired address terminating the arrangement.

In yet another embodiment, the second party device 108 acts as custodial escrows for the first party and a fourth party during a transaction/trade to minimize counter party risk and guarantee settlement. However, a custodial escrow mechanism, with respect to cryptocurrencies may encounter a new problem of keeping the first party funds/tokens in their custody safe and secure. A security breach on the respective cryptocurrency escrows' systems can compromise the private-keys/secrets securing the funds/tokens in their custody and lead to loss/theft of respective funds/tokens.

In yet another embodiment, the present invention can enforce settlement albeit with a predefined delay and does not require exclusive custody of the said funds/tokens beforehand to guaranteed settlement. Moreover, in the event of the security breach on one or both sides, there are remedial steps that the cryptocurrency escrow and/or the first party can take to prevent loss or theft of the respective funds/tokens.

In yet another embodiment, the first party may cooperate with the second party in the settlement process and in situations where it disagrees or refuses to cooperate, the cryptocurrency escrow can get exclusive custody of the respective funds/tokens and enforce settlement.

In an embodiment, in accordance with the present disclosure, the first party is in disagreement with a proposed settlement for a trade/transaction with the fourth party, the cryptocurrency escrow takes exclusive custody of the respective funds/tokens to enforce settlement. This option allows the cryptocurrency escrow to function as a regular custodial escrow between the first party and the fourth party during a trade/transaction, as is the case with most exchanges as of date.

Figure 7:
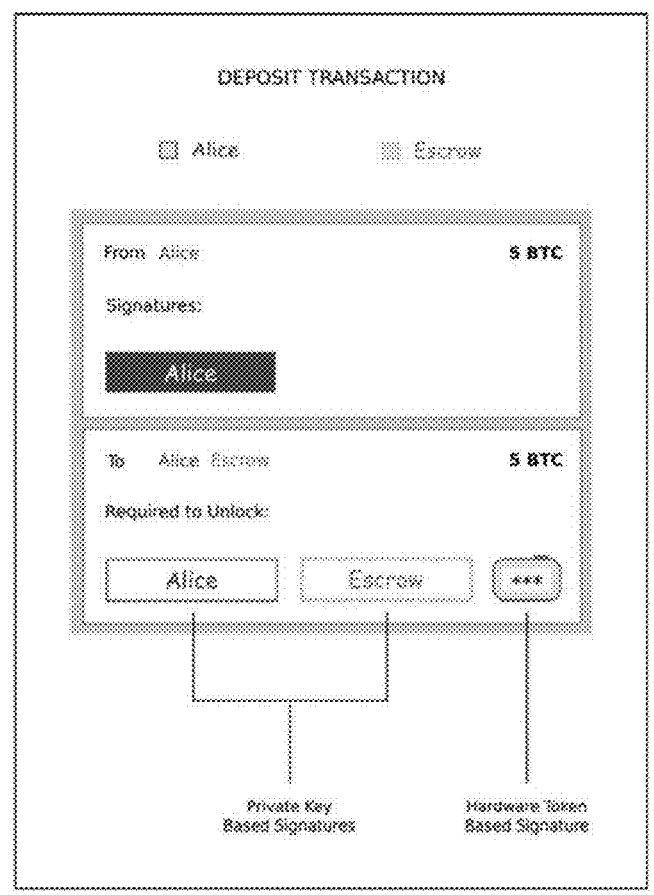
FIG. 7 illustrates an example of a Deposit Transaction created by a First Party (Alice), in accordance with the embodiment of the present invention.

Illustrative Examples showing various aspects of implementation of the present invention:

FIGS. 7-11 illustrate examples showing implementation for the secure cryptocurrency escrow. FIG. 7 illustrates an example of a deposit transaction created by the First Party Alice in accordance with an embodiment of the present invention.

Figure 8:
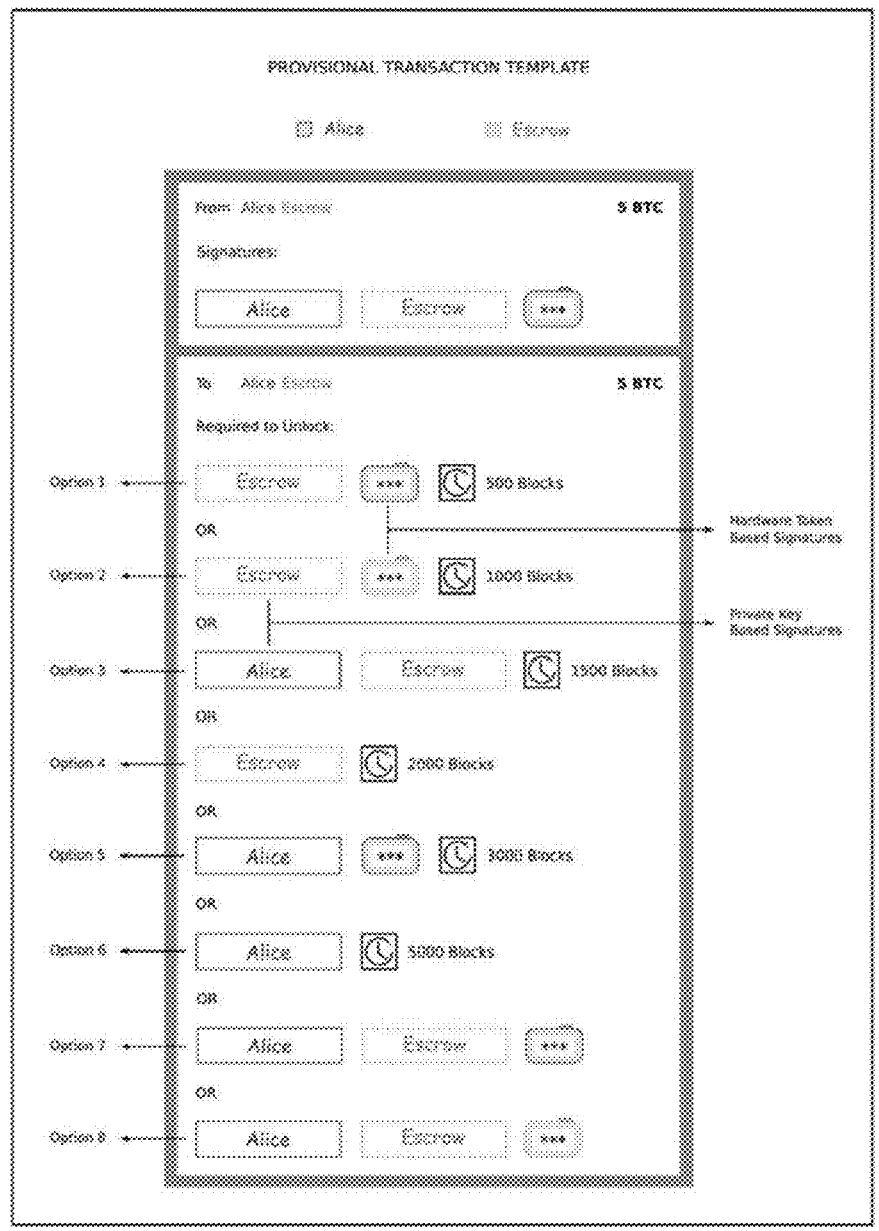
FIG. 8 illustrates an example of a provisional transaction template created by the First Party Alice, in accordance with the embodiment of the present invention.

FIG. 8 illustrates an example of a provisional transaction template created by the first party Alice in accordance with an embodiment of the present invention. The cryptocurrency escrow suffers a security breach as its private-keys/secrets are compromised/stolen. The escrow uses option 1, 2, 3, 7 or 8 as depicted in FIG. 8 to transfer the funds/tokens to another secure address or back to the First Party. The cryptocurrency escrow can even prevent loss/theft using option 7 depicted in FIG. 8 and transfers the respective funds/tokens away from the compromised address even when its Hardware Tokens are lost/stolen in the above described situation. Optionally, the cryptocurrency escrow uses option 2 as depicted in FIG. 8 and transfers the respective funds/tokens to a secure address when the first party's private-key/secret and/or the hardware token are compromised/lost/stolen.

Figure 9:
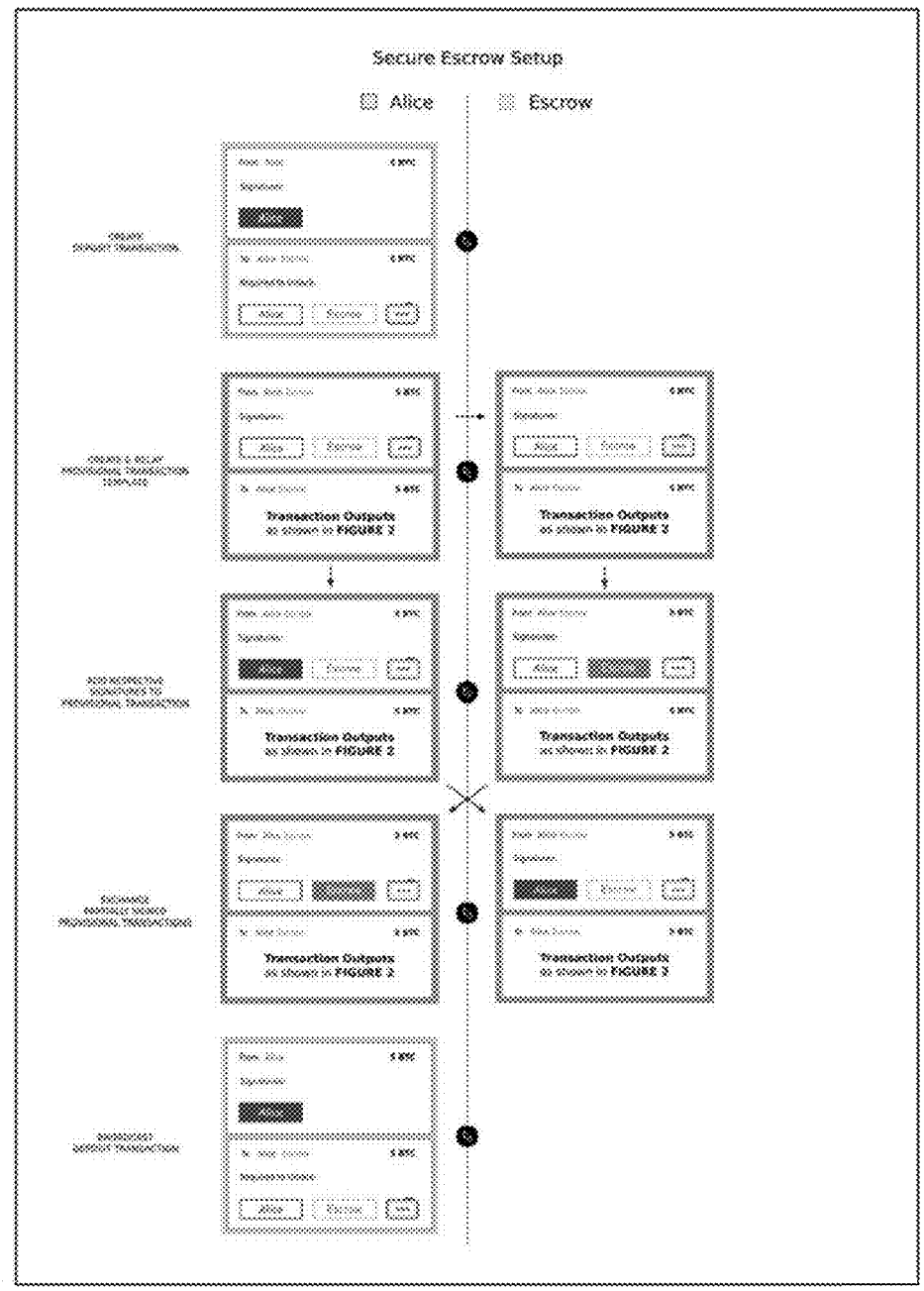
FIG. 9 illustrates an example of a computer system for enabling secure escrow and safekeeping of a cryptocurrency, in accordance with the embodiment of the present invention.

FIG. 9 illustrates an example of a secure cryptocurrency computer system 900 in accordance with an embodiment of the present invention.

Figure 10:
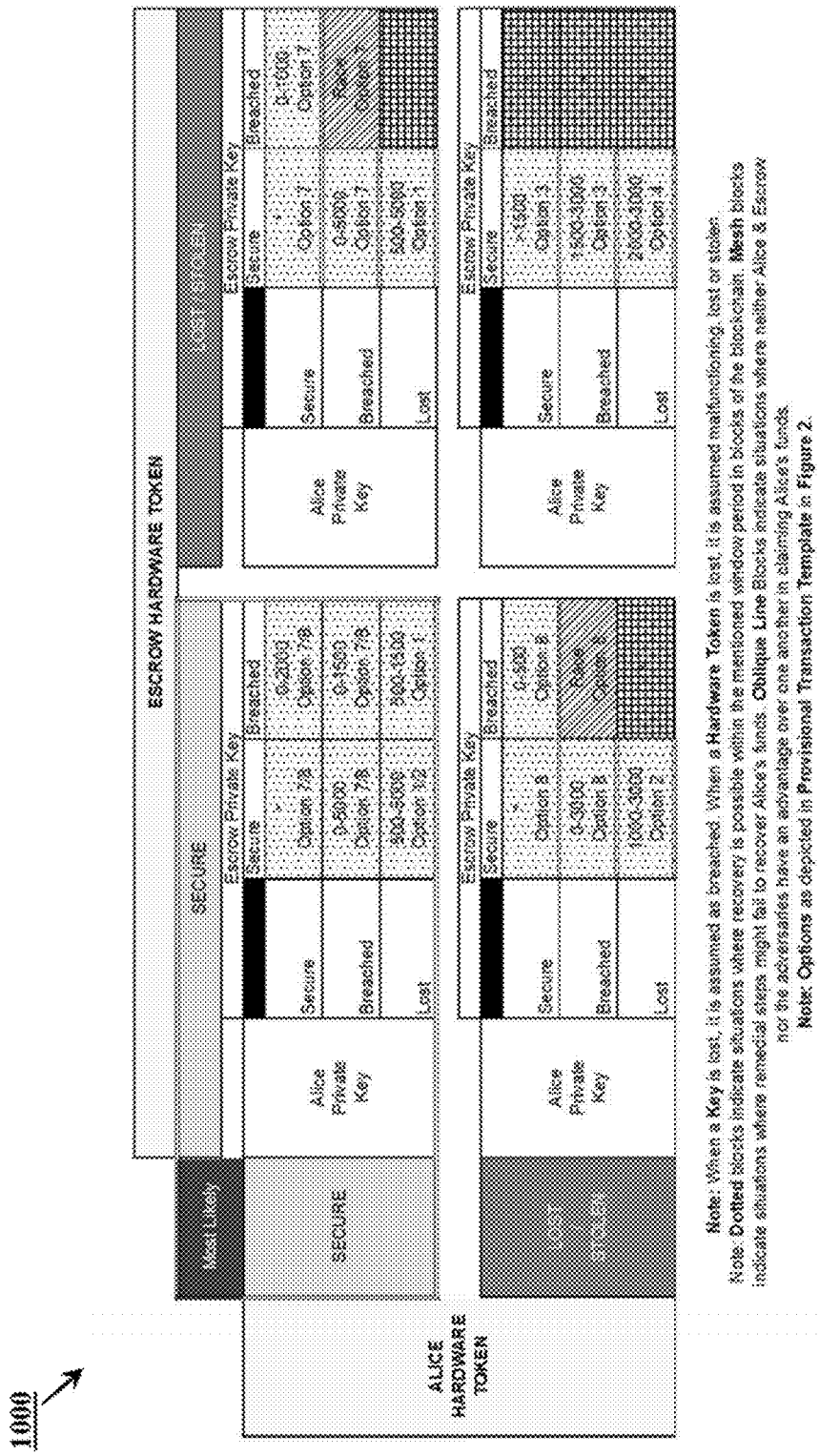
FIG. 10 illustrates an example of enumerating the options available and outcomes of situations where the First Party and/or the Second Party (A Secure Cryptocurrency Escrow) lose their private-keys/secrets and/or Hardware Tokens, in accordance with the embodiment of the present invention.

FIG. 10 illustrates an example of enumerating the options available and outcomes of situations where the First Party loses its private-keys/secrets and where the First Party and/or the Second Party (A Secure Cryptocurrency escrow) lose their respective Hardware Tokens in accordance with an embodiment of the present disclosure. The confusion Matrix in FIG. 10 also enumerates the options available and outcomes of situations where the private-keys/secrets and/or the Hardware Tokens of the First Party and/or the Second Party are compromised or stolen. It enumerates the situations where respective private-keys/secrets are lost by the First Party but not the Second Party. The Second Party is an organized entity that can employ data-safety measures such as multi-site replication, offline storage, etc. The method does not appear to explicitly specify the process and enumerate options available when the Second Party's private-keys/secrets are lost for simplicity and brevity.

In an embodiment, the method and system can be analogously extended to aforementioned scenario or more scenarios not currently addressed if desired by reordering/adding/removing options in the Provisional Transaction Template and expanding the multi-signature scheme in the Deposit Transaction by requiring even more signatures using private/keys and/or hardware tokens. Also, the timelocks mentioned in the Provisional Transaction Template are one of the many possible values for them exemplifying a particular order and can be adjusted as necessary to suit a particular arrangement. In an embodiment, the Second Party (Escrow) always gets a first claim on the respective funds/tokens as it is accepting a liability on the First Party's behalf and can steal the First Party's funds/tokens but will not do so because such unilateral actions will result in loss of trust/business from the other parties as well as legal proceedings by the First Party as the Second Party cannot deny and deflect liability as is common today. Hence, the incentive and motive to cheat the First Party of its funds/tokens by the Second Party is non-existent. In case, the First Party and/or the Second Party are compromised either by an internal or external adversary, they still have recourse and can reconcile the situation by taking remedial steps available.

Figure 11:
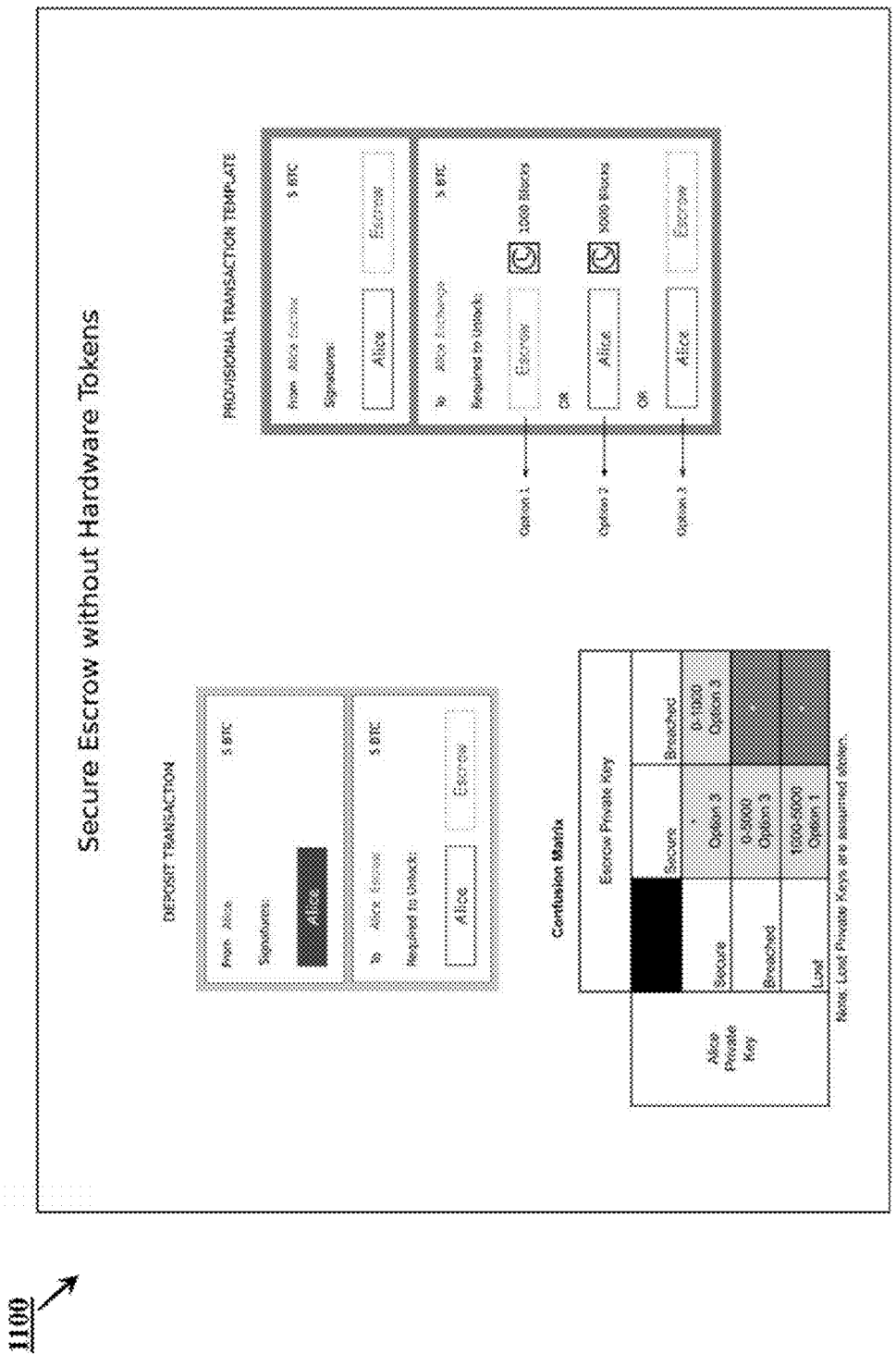
FIG. 11 illustrates an example of a secure escrow system without the hardware tokens, in accordance with the embodiment of the present invention.

FIG. 11 illustrates another example of a secure cryptocurrency computer system 1100 without hardware tokens in accordance with an embodiment of the present disclosure. In an embodiment, in case the Hardware Tokens are not available and relative/absolute timelocks are available only, the aforementioned method/system/scheme can be scaled down as depicted in FIG. 11 and still offer better protection than currently practiced multi-signature arrangements.

Figure 12:
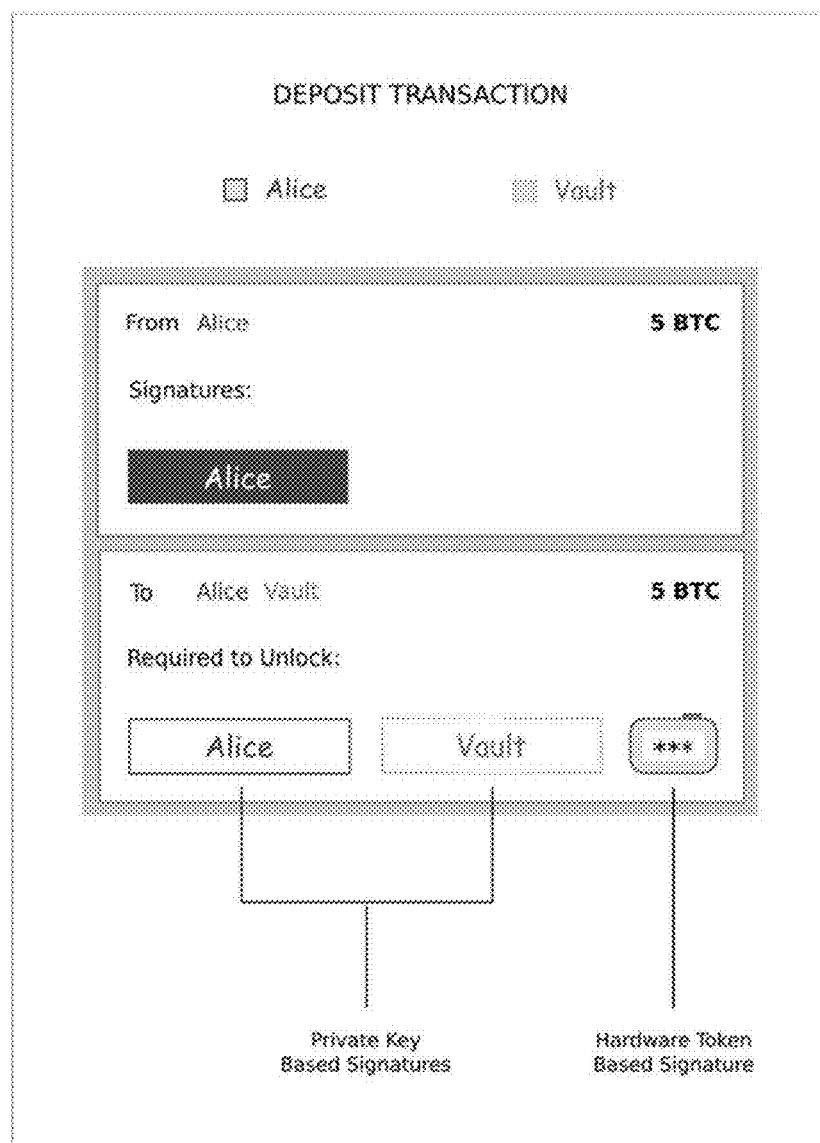
FIG. 12 illustrates an example of a Deposit Transaction created by the First Party (Alice), in accordance with an embodiment of the present disclosure.

FIGS. 12-16 illustrate examples showing implementation for the secure cryptocurrency vault. FIG. 12 illustrates an example of a Deposit Transaction created by the First Party in accordance with an embodiment of the present disclosure.

Figure 13:
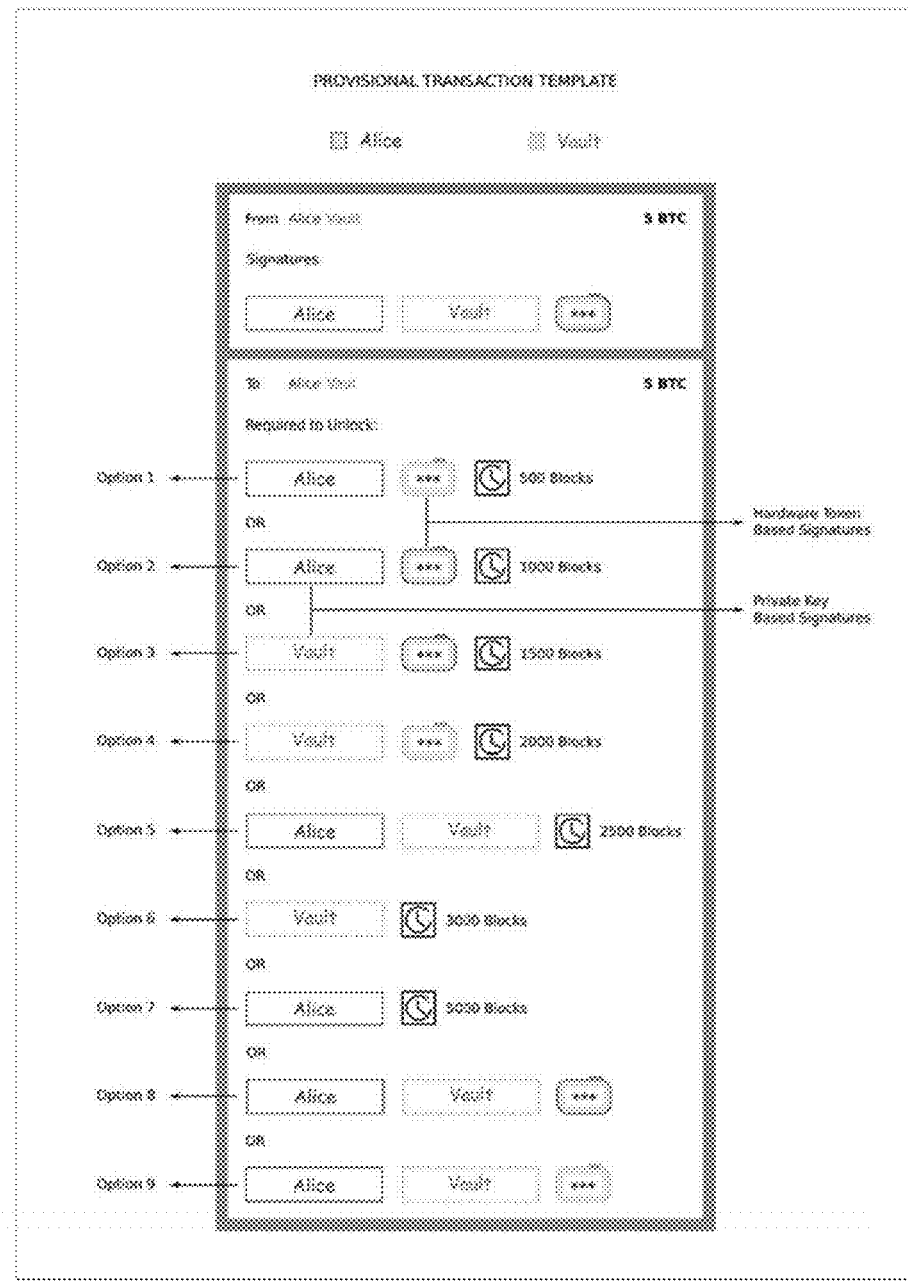
FIG. 13 illustrates an example of a Provisional Transaction Template created by the First Party (Alice), in accordance with an embodiment of the present disclosure.

FIG. 13 illustrates an example of a Provisional Transaction Template created by the First Party in accordance with an embodiment of the present disclosure. The cryptocurrency vault suffers a security breach as its private-keys/secrets are compromised/stolen. The vault uses option 1, 2, 3, 4, 5, 8 or 9 as depicted in FIG. 13 to transfer the funds/tokens to another secure address or back to the First Party. The cryptocurrency escrow can even prevent loss/theft using option 2, 3 or 8 depicted in FIG. 13 and transfers the respective funds/tokens away from the compromised address even when its Hardware Tokens are lost/stolen in the above described situation. Optionally, the cryptocurrency vault uses option 4 as depicted in FIG. 13 and transfers the respective funds/tokens to a secure address when the first party's private-key/secret and/or the hardware token are compromised/lost/stolen.

Figure 14:
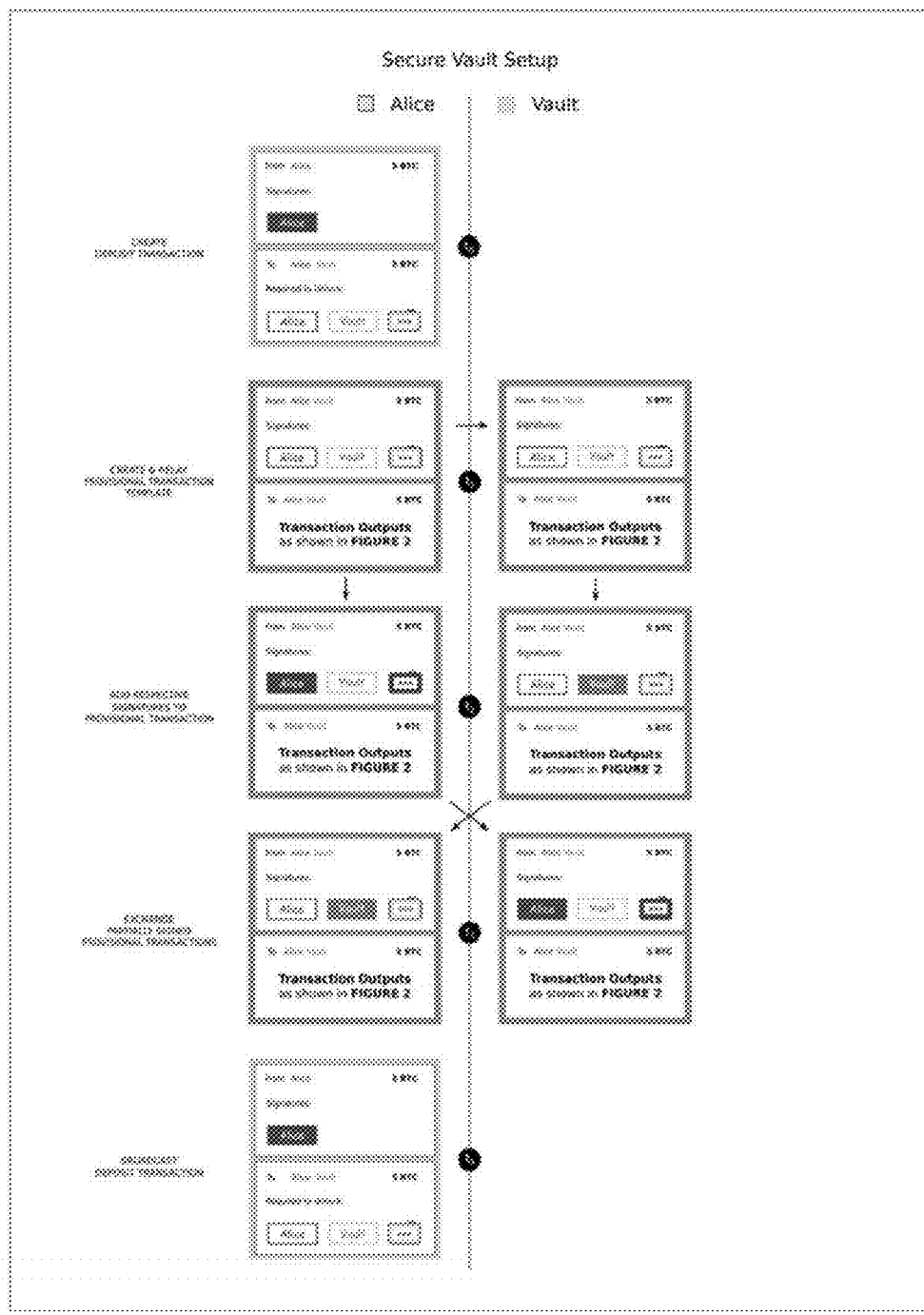
FIG. 14 illustrates an exemplary secure cryptocurrency vault, in accordance with an embodiment of the present disclosure.

FIG. 14 illustrates an exemplary secure cryptocurrency vault in accordance with an embodiment of the present disclosure. The First Party has lost the private-key/secret and/or Hardware Token as in the confusion matrix, the Second Party will not steal the First Party's funds/tokens because unilateral actions will result in loss of trust/business from other parties as well as legal proceedings by the First Party as the Second Party cannot deny and deflect liability as is common today. Hence, the incentive and motive to cheat the First Party by the Second Party does not exist.

Figure 15:
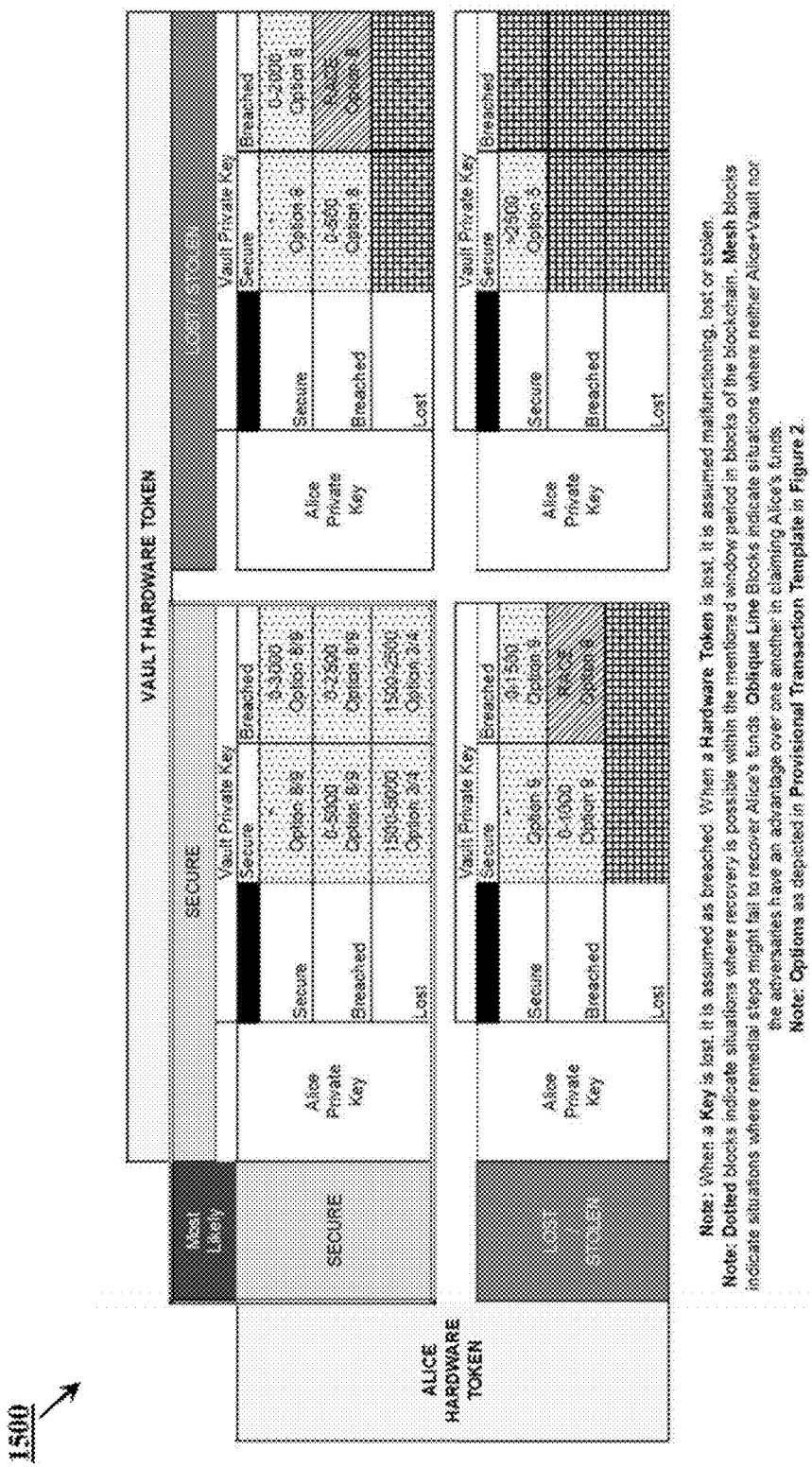
FIG. 15 illustrates exemplary options available and outcomes of situations where the First Party and/or the Second Party lose their private-keys/secrets and/or Hardware Tokens, in accordance with an embodiment of the present disclosure.

FIG. 15 illustrates exemplary options available and outcomes of situations where the First Party loses its private-keys/secrets and where the First Party and/or the Second Party (A Secure Cryptocurrency Vault) lose their respective Hardware Tokens in accordance with an embodiment of the present disclosure. The confusion Matrix in FIG. 10 also enumerates the options available and outcomes of situations where the private-keys/secrets and/or the Hardware Tokens of the First Party and/or the Second Party are compromised or stolen. It enumerates the situations where respective private-keys/secrets are lost by the First Party but not the Second Party. The Second Party is an organized entity that can employ data-safety measures such as multi-site replication, offline storage, etc. The method does not appear to explicitly specify the process and enumerate options available when the Second Party's private-keys/secrets are lost for simplicity and brevity.

In an embodiment, this method can be analogously extended to this scenario and more or simplified if desired by reordering/adding/removing options in the Provisional Transaction Template accordingly and expanding the multi-signature scheme in the Deposit Transaction by requiring even more signatures using private keys/secrets and/or hardware tokens when planning and accounting for certain contingencies are deemed necessary/unnecessary. Also, the timelocks mentioned in the Provisional Transaction are one of the many possible values for them exemplifying a particular order and can be adjusted as necessary to suit a particular arrangement.

Figure 16:
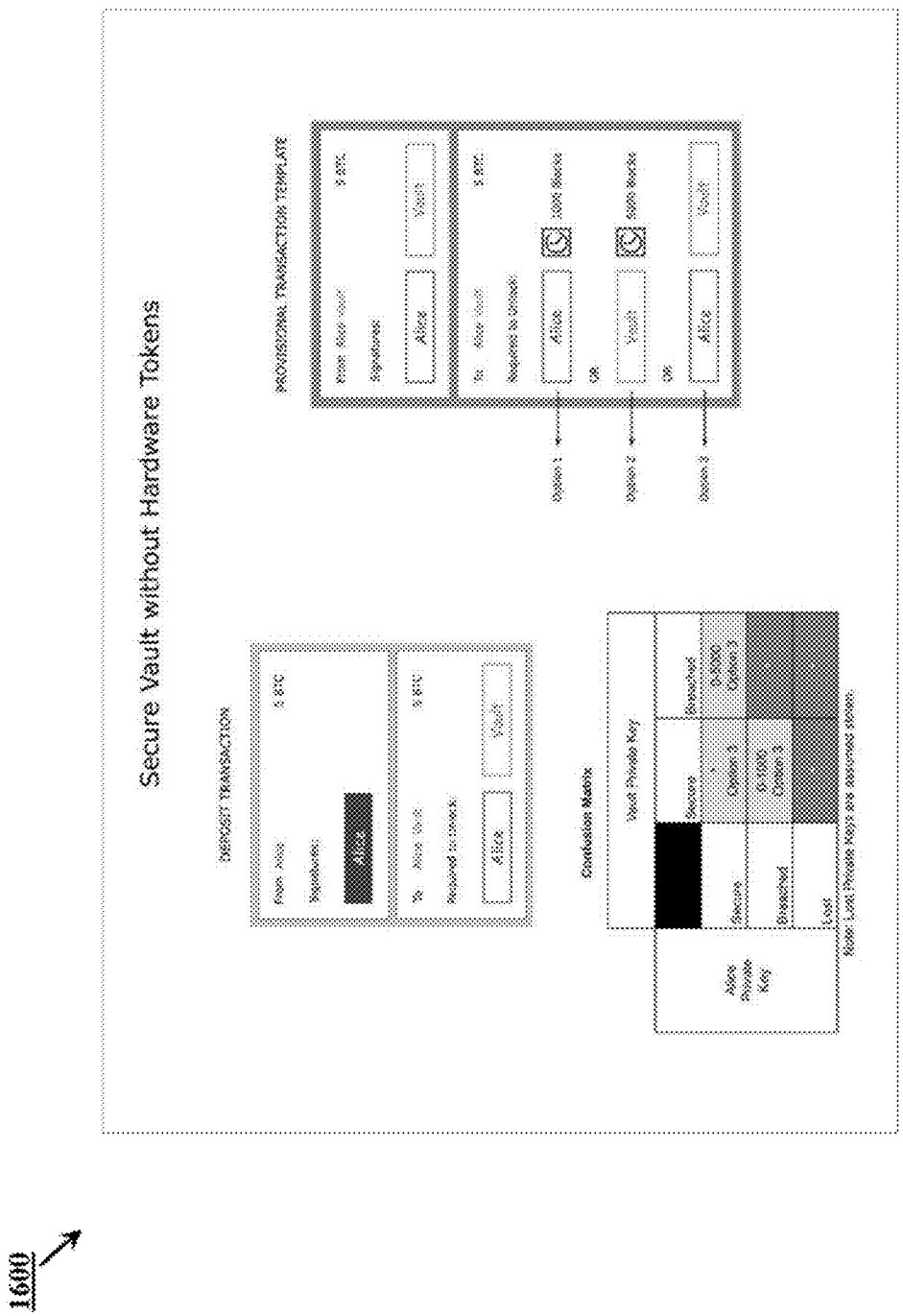
FIG. 16 illustrates an example of a secure cryptocurrency vault without Hardware Tokens, in accordance with an embodiment of the present disclosure.

FIG. 16 illustrates an example of a secure cryptocurrency vault without Hardware Tokens in accordance with an embodiment of the present disclosure. In case the Hardware Tokens are not available and relative/absolute timelocks are functional, the method and scheme described above can be scaled down as depicted in FIG. 16 and still offer better protection than currently practiced multi-signature arrangements.

The disclosed system and the method offer a number of advantages, such as: The present invention provides a digital currency escrow and a secure digital currency depository. Additionally, it provides a digital currency escrow which enforces settlement albeit with a predefined delay and the escrow does not need exclusive custody of the funds/tokens beforehand to guarantee settlement. The digital currency escrow also safeguards the funds/tokens of the participating parties as well as enhances the security. The present invention provides a digital currency escrow which enables the transfer of funds/tokens away from the multi-signature address by adding missing signatures to the partially signed Provisional Transaction Template in possession of the First Party Device and the Second Party Device, even when the respective private-keys/secrets and/or Hardware Tokens are lost and/or stolen. Further, the present invention allows a security from unauthorized access to one's private-keys/secrets through whatever means (Trojans, man-in-the-middle, cloud backdoors, etc.). The present invention also allows a data-safety by denying/destroying access to one's private-keys/secrets (ransomware, computer-virus, etc.).

It should be noted that where the terms "server", "secure server" or similar terms are used herein, a communication device is described that may be used in a communication system, unless the context otherwise requires, and should not be construed to limit the present disclosure to any particular communication device type. Thus, a communication device may include, without limitation, a bridge, router, bridge-router (router), switch, node, or other communication device, which may or may not be secure.

Further, the operations need not be performed in the disclosed order, although in some examples, an order may be preferred. Also, not all functions need to be performed to achieve the desired advantages of the disclosed system and method, and therefore not all functions are required.

The terms and descriptions used herein are set forth by way of illustration only and are not meant as limitations. Examples and limitations disclosed herein are intended to be not limiting in any manner, and modifications may be made without departing from the spirit of the present disclosure. Those skilled in the art will recognize that many variations are possible within the spirit and scope of the disclosure, and their equivalents, in which all terms are to be understood in their broadest possible sense unless otherwise indicated.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

The invention claimed is:

1. A computer-implemented method for enabling secure escrow and safekeeping of a cryptocurrency, the computer-implemented method comprising the steps of:

establishing a secure communication between a first party device associated with a depositor of the cryptocurrency and a second party device associated with a secure cryptocurrency depository, in a cryptocurrency network;

creating and signing a deposit transaction by the first party device transferring all available funds/tokens or part thereof to a multi-signature address;

creating a provisional transaction template by the first party device spending either all of the funds/tokens or a part thereof, sent to the multi-signature address in the deposit transaction;

transmitting an unsigned copy of the provisional transaction template to the second party device;

adding a signature generated using a first party private key and a signature generated by a first party hardware token by the first party device to the provisional transaction template, thereby generating a first partially signed provisional transaction template and transmitting the first partially signed provisional transaction template to the second party device;

adding a signature generated using a second party private key corresponding to the first party private key, by the second party device to the provisional transaction template, thereby generating a second partially signed provisional transaction template and sending the second partially signed provisional transaction template to the first party device;

broadcasting the deposit transaction by the first party device after the first party device and the second party device exchange the first partially signed provisional transaction template and the second partially signed provisional transaction template;

facilitating the provisional transaction by the first party device by adding the signature generated using the first party private key and the signature generated by the first party hardware token to the second partially signed provisional transaction template in possession, forming a fully signed provisional transaction template;

facilitating the provisional transaction by the second party device by adding the signature generated using the second party private key to the first partially signed provisional transaction template in possession, forming the fully signed provisional transaction template, thereby presenting an alternate way;

broadcasting a fully signed provisional transaction template by the first party device and/or the second party device to the cryptocurrency network;

wherein the first party device and/or the second party device is enabled to transfer the available funds/tokens away from the multi-signature address using the second partially signed provisional transaction template and/or the first partially signed provisional transaction template in possession of the first party device and second party device respectively.

2. The computer-implemented method as claimed in claim 1, wherein the secure cryptocurrency depository associated with the second party device is a secure cryptocurrency escrow and/or a secure cryptocurrency vault.

3. The computer-implemented method as claimed in claim 1, further comprising the step of creating the provisional transaction template by the second party device in case a transaction ID and a corresponding transaction output index of the deposit transaction is transmitted to the second party device by the first party device.

4. The computer-implemented method as claimed in claim 1, wherein signing the deposit transaction and the provisional transaction template prevents the corresponding inputs and outputs of the deposit transaction and the provisional transaction template from modification once the signature generated using the respective private keys/secrets and/or signatures generated by respective hardware tokens are added to the deposit transaction and the provisional transaction template.

5. The computer-implemented method as claimed in claim 1, wherein the first party device and the second party device are computing devices selected from a group comprising a server, a microcontroller, a laptop, a desktop and a portable handheld device having computing capabilities and comprising at least a processor, a memory unit, a display module, an input module and a user interface.

6. The computer-implemented method as claimed in claim 1, further comprising the step of monitoring the transactions on the cryptocurrency network by the first party device, the second party device and/or a third-party device on behalf of the first and/or second party device.

7. The computer-implemented method as claimed in claim 1, further comprising the step of enforcing a settlement albeit with a predefined delay and does not require exclusive custody of the funds/tokens beforehand to guarantee settlement.

8. The computer-implemented method as claimed in claim 1, further comprising the step of taking exclusive custody of the respective funds/tokens to enforce the settlement, in case of disagreement between a first party device and a fourth party device during a trade/transaction, thereby functioning as a regular custodial escrow.

9. A computer system for enabling secure escrow and safekeeping of a cryptocurrency, the computer system comprising:

a memory unit configured to store machine-readable instructions; and a processor operably connected with the memory unit, the processor obtaining the machine-readable instructions from the memory unit, and being configured by the machine-readable instructions to:

establish a secure communication between a first party device associated with a depositor of the cryptocurrency and a second party device associated with a secure cryptocurrency depository, in a cryptocurrency network;

create and sign a deposit transaction on the first party device transferring all available funds/tokens or part thereof to a multi-signature address;

create a provisional transaction template on the first party device spending either all of the funds/tokens or a part thereof, sent to the multi-signature address in the deposit transaction;

transmit an unsigned copy of the provisional transaction template to the second party device;

generate a first partially signed provisional transaction template by adding a signature generated using a first party private key and a signature generated by a first party hardware token on the first party device to the provisional transaction template and transmit the first partially signed provisional transaction template to the second party device;

generate a second partially signed provisional transaction template by adding a signature generated using a second party private key corresponding to the first party private key, on the second party device to the provisional transaction template and transmit the second partially signed provisional transaction template to the first party device;

broadcast the deposit transaction from the first party device after the first party device and the second party device exchange the first partially signed provisional transaction template and the second partially signed provisional transaction template respectively;

facilitate the provisional transaction by the first party device by adding the signature generated using the first party private key and the signature generated by the first party hardware token to the second partially signed provisional transaction template in possession of the first party device, forming a fully signed provisional transaction template;

facilitate the provisional transaction by the second party device by adding the signature generated using the second party private key to the first partially signed provisional transaction template in possession of the second party device, forming the fully signed provisional transaction template, thereby presenting an alternate way;

broadcast a fully signed provisional transaction template by the first party device and/or the second party device to the cryptocurrency network, wherein the first party device and/or the second party device is enabled to transfer the available funds/tokens away from the multi-signature address using the second partially signed provisional transaction template and/or the first partially signed provisional transaction template in possession of the first party device and second party device respectively.

10. The computer system as claimed in claim 9, wherein the secure cryptocurrency depository associated with the second party device is a secure cryptocurrency escrow and/or a secure cryptocurrency vault.

11. The computer system as claimed in claim 9, wherein the processor is further configured to create the provisional transaction template by the second party device in case a transaction ID and a corresponding transaction output index of the deposit transaction is transmitted to the second party device by the first party device.

12. The computer system as claimed in claim 9, wherein the processor is further configured to prevent the corresponding inputs and outputs of the deposit transaction and the provisional transaction template from modification once the signatures generated using the respective private keys/secrets and/or signatures generated by respective hardware tokens are added to the provisional transaction template.

13. The computer system as claimed in claim 9, wherein the first party device and the second party device are computing devices selected from a group comprising a server, a microcontroller, a laptop, a desktop and a portable handheld device having computing capabilities and comprising at least a processor, a memory unit, a display module, an input module and a user interface.

14. The computer system as claimed in claim 9, wherein the processor is further configured to monitor the transactions on the cryptocurrency network by the first party device, the second party device and/or a third-party device on behalf of the first party device and/or second party device.

15. The computer system as claimed in claim 9, wherein the processor further configures the second party device to enforce a settlement albeit with a predefined delay and does not require exclusive custody of the funds/tokens beforehand to guarantee settlement.

16. The computer system as claimed in claim 9, wherein the processor further configures the second party device to take exclusive custody of the respective funds/tokens to enforce the settlement, in case of disagreement between a first party device and a fourth party device during a trade/transaction, thereby functioning as a regular custodial escrow.

* * * * *